INVENTORS
DONALD W. HANEY
CHARLES S. JACKOWSKI
BY Maurice H. Klitzman
ATTORNEY

Oct. 3, 1961 D. W. HANEY ET AL 3,002,677

RECORD CARD PUNCHING MACHINE

Filed May 18, 1959 5 Sheets-Sheet 3

Oct. 3, 1961 D. W. HANEY ET AL 3,002,677
RECORD CARD PUNCHING MACHINE
Filed May 18, 1959 5 Sheets-Sheet 5
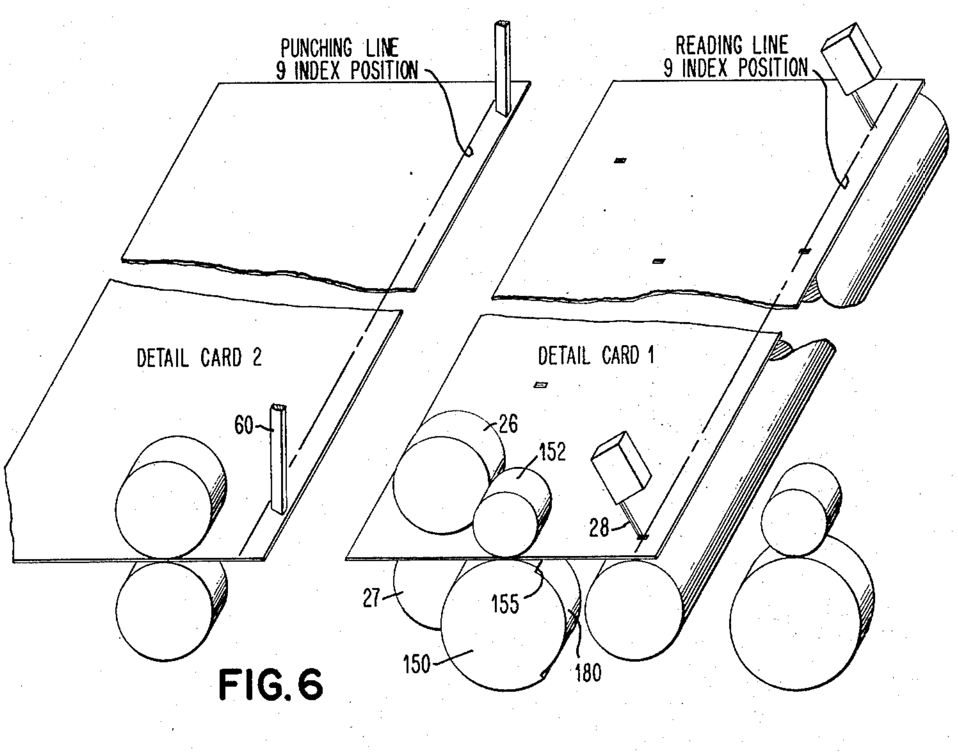
FIG. 6
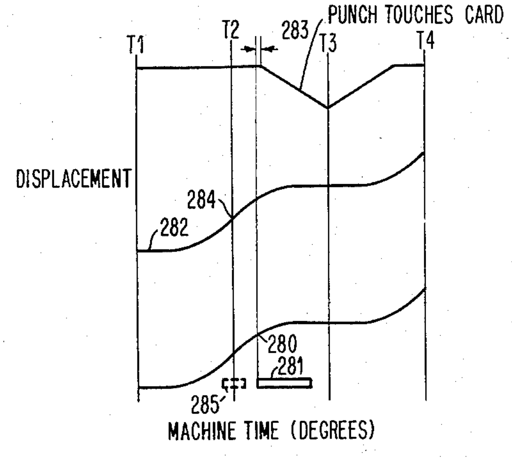
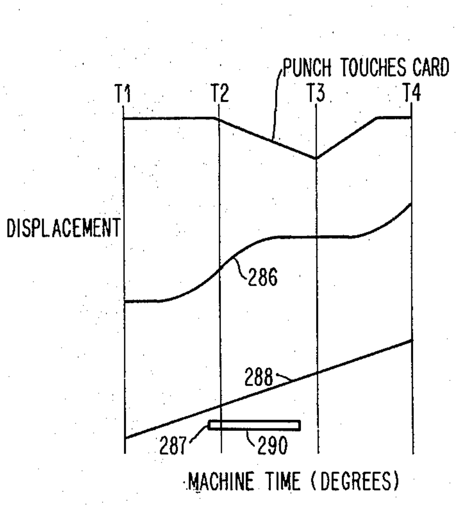
FIG. 7 FIG. 8

3,002,677
RECORD CARD PUNCHING MACHINE

Donald W. Haney, Vestal, and Charles S. Jackowski, Endicott, N.Y., assignors to International Business Machines Corporation, New York, N.Y., a corporation of New York Filed May 18, 1959, Ser. No. 813,888
7 Claims. (Cl. 234—64)

This invention relates to a record card punching machine, and in particular, to a high speed read punch for reproducing business record keeping cards by transmitting recorded information from a card into a preceding or succeeding card.

Generally, in reproducing business cards, the cards are removed from a hopper by feed knives or the like. The cards are fed into feed rolls past first reading brushes which sense openings in the card which in turn represent bits of information. The pulses received by the read brushes enter a computer for calculation purposes. The cards are then passed through a punching station where the output of the computer controls the action of punches to perforate the cards. The cards then pass through second reading brushes which sense the openings in that card to provide an impulse for controlling the action of the punch to punch common information into an immediately following card. Also, the second read brushes can be used to verify the information represented by the punching already accomplished. Additional feed rolls then transport the card into a stacker for storing purposes. In order to obtain an impulse at a read station, a contact roll is positioned opposite the brushes so that when the card passes between the brush and roll, contact will be made when the brush drops through a hole onto the contact roll. This is the pulse used for controlling the action of the punch. Now the speed of card transport through the punch station and read station and the size of the hole determines the length of time for the brush to read and establish a pulse.

The punch operating mechanism is generally oscillated for each intermittent motion of the card without movement of the punch due to a clearance between the mechanism and the punch. In order to perforate the card, a magnet is actuated to control the movement of an interposer over the punch when a pulse is received. The interposer fills the clearance between the punch mechanism and punch so that the punch mechanism oscillation will be transmitted to the punch to move the punch through the card.

If the pulse received from the read brushes is to be recognized and used by the punch at the appropriate time without storing mechanism, the brushes must be accurately located to read a hole at the proper time. The punch which receives the pulse must be so timed that it will properly recognize the impulse. For this reason, the punches must be timed with the reading so that they operate in synchronism with each other. In order to punch the proper information as read, the index point of the card at the punching station must correspond to the same index point on the card at the read station. For example, if a 7 hole is read at the 7 index position on the card, the 7 hole must be punched when the 7 column or index position reaches the punching station. Generally, the card is moved intermittently through the punch station and punched while the card is standing still. Since a standard card has 12 punching positions and it has been convenient to use a card that is 3¼″ from top to bottom, the distance between centers of adjacent punching positions is ¼″. This is commonly referred to as a cycle point or index point which must result in a ¼″ movement of the card. Therefore, when a card is at the read station and being read at an index position such as the 8 position, at the same time the next immediately succeeding card is at the punch station with the card having its 8 index position under the punch. In other words, common information is transmitted by reading from one card and punching the information into an immediately following card, each card serving as a master card for the following card. However, if an opening is not present at an index position being read, an impulse is not obtained to punch the same index position in the card at the punch station. The card is then moved to the next index position.

In order to punch information from a master card into an immediately following card, the master card is fed first, and as it passes through the punch station, no punching takes place. The punch brushes read information from the master card that is common to all of the following detail cards, and when the master card reaches the read brushes the next card is at the punch station. When the information is punched from the master card at the read station into the next detail card at the punch station the cards then move one station with the first detail card now at the brush station and the second detail card at the punch station. The read brushes then read the first detail card as they did with the master card so that information from the first detail card then is transposed into the second detail card. This continues until all of the cards have been punched with this common information.

For purposes of this invention, one card cycle is intended to cover the time and distance required to move from a given index position on the first card to the corresponding index position on the second card. For example, if a 5 hole in a card is read at the read station at a given time in a card feed cycle, a 5 hole will appear at the same time at the punch station, but one card feed cycle later removed. Also, card movement at the read station is considered to be in phase with card movement at the punch station when both cards are moved intermittently with substantially simultaneous acceleration and deceleration. Further, card movement out of phase is intended to cover card motion at the read station being continuous, and intermittent at the punch station, or intermittent motion at the read station but not having substantially simultaneous acceleration, deceleration and dwell periods as at the punch station.

Since the punching and reading is timed to start and to complete at a specific time during a cycle, it has been the practice to gear the punch drive and the feed rolls together. However, since it takes time for the read brushes to obtain a pulse and deliver it to a magnet to actuate an interposer through a set of linkages, and thereafter to actuate the punch, it was common prior practice to read slightly earlier than the time for beginning the punch stroke when the card is at the same index position at the punch station. This time to set up the punch control mechanism is commonly referred to as a time delay. However, in order to maintain the proper timing relationships of reading from a lead card to punch a following card, it has been the practice to move a card intermittently through the read station in synchronism with a card moving intermittently through the punch station. In order to take care of time delays inherent when reading and punching which occur at the same time, on occasion it has been the practice to read a card a cycle point ahead of a card being punched at the punch station in order to set up the control mechanism for the next punch and provide for the time delays. However, the speed of card output of such an arrangement is not increased since reading and punching are in phase.

A problem has been caused by the use of a Geneva mechanism for intermittently driving the card through the punch station and the read station. This creates an acceleration and deceleration period both at the punch station and at the read station for each index position that the card is moved. Therefore, it requires the reading brushes to read at the read station during an acceleration or deceleration period. This is at a point of time when the speed of the card is nearing its highest velocity. This results in a period of time governed by the deceleration of the card coming to a stop under the brushes in which to pulse the punch magnets and hold the pulse until the punch has been set up. It is important to provide a pulse sufficiently long to hold the magnet in its operative position so that a sufficient length of time has elapsed in order for the time delays to take place. Of course, the faster the cards move through the read station, the less time is available for holding the pulse since the same time delays exist. The shortening of time for pulsing places a limitation on the speed with which openings in record cards can be sensed and this information transmitted into a punch station for punching into succeeding detail cards.

Now, in prior mechanisms where the cards at the read station and punch station were driven in synchronism, the distance between openings placed a limitation on the amount of movement that the brushes could be moved. The only amount of movement that was available was determined by the distance that the toe of the brush left a hole and the heel of the brush entered the next hole. Therefore, it was difficult to significantly move the brushes without reading an adjacent hole prematurely. If the brushes were moved, they could only be moved in increments of a complete cycle point. However, this required either electrical or mechanical storage devices to hold the pulse until such time as it was needed for punching. Also, movement of the brushes closer to the punch station resulted in the card moving at a high level of speed while an opening was being read. This had the same effect as merely speeding up card movement as explained above which resulted in less time for holding the pulse to accommodate time delays.

Further, an increase in speed of the Geneva that drives the feed rolls at the punch and read stations to increase card output speed resulted in higher acceleration forces due to the driven mass. This increase in acceleration forces has been too great for the Geneva wheels to withstand. Therefore, the increase of acceleration forces due to increase in speed, coupled with the shortening of pulse time for reading has placed a limitation on the use of prior punching mechanisms with relation to high speed punching.

It is therefore an object of this invention to provide a mechanism for reading and punching business record cards whereby the reading is performed sufficiently early to accommodate time delays, and to set up the punch mechanism while it is still in the process of punching, yet providing a pulse sufficiently long to accommodate the time delays and to minimize the effects of mass accompanying the high speed condition.

It is another object to provide a card read punch for permitting the reading of a later index point while punching at an earlier index point (or portion thereof) without storage mechanism, by a simpler means than has heretofore been used, and still attain higher punching speeds.

It is a further object of this invention to provide a card read punch in which the read brushes are positioned to read out of phase with the intermittent motion cycle at the punch station, as compared to prior read punches which read the card during substantially the same intermittent movement cycle as at the punch station, even though the reading may take place slightly earlier than punching to accommodate time delays.

It is a still further object of this invention to provide a card read punch having an increased card output speed which is accomplished by providing a synchronous motion of the card at the read station with respect to the card at the punch station.

It is yet another object of this invention to provide a card read punch which does not require that an index point be read at the read station at the exact time that the same or different index point is at the same relative position at the punch station.

Briefly stated and in accordance with one aspect of this invention, we provide a punch mechanism which has intermittent motion at the punch station and continuous motion at the read station by using intermittent feed rolls which have means for accommodating continuous movement of the card through the intermittent rolls, and continuously feeding rolls at the read station which can accommodate intermittent motion of the cards during their continuous motion, and the read station being spaced from the punch station a distance which is different from one card cycle in order to obtain a pulse which is sufficiently long to accommodate the time delays in the mechanism even though the speed of punching and movement of the cards has been considerably increased.

Other objects of the invention will be pointed out in the following description and claims and illustrated in the accompanying drawings, which disclose, by way of examples, the principle of the invention and the best mode, which has been contemplated, of applying that principle.

In the drawings:

FIGS. 4–6 are schematic views showing the different positions of the card and location of the holes and the feed rolls with respect to the read brushes.

FIG. 7 shows velocity curves representing in phase card movement through the punch and read station.

FIG. 8 shows velocity curves representing out of phase card movement at the read station with respect to card movement at the punch station.

Figure 1:
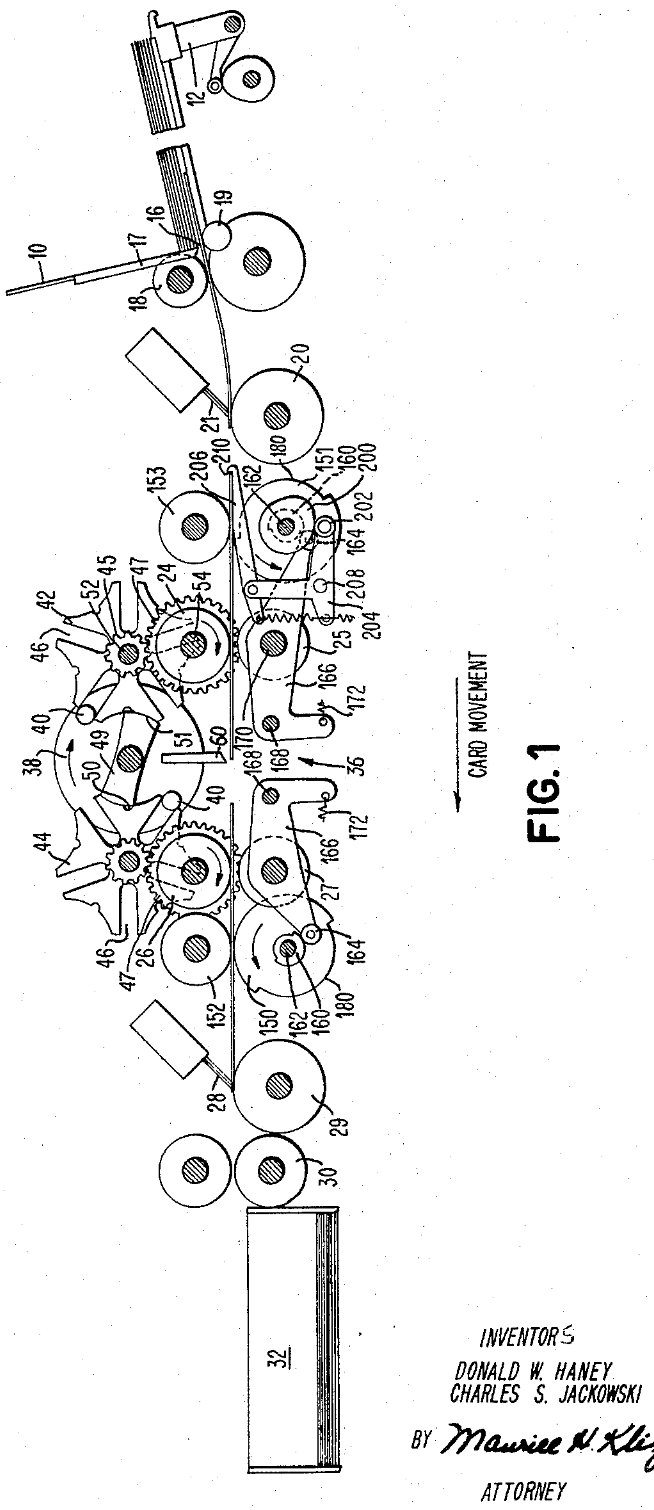
FIG. 1 is a schematic view of the card read punch mechanism.

Referring to FIG. 1, a hopper 10 is provided which contains cards which are adapted to be removed by picker knives 12. The picker knife is provided with camming mechanism so as to oscillate. The cards are fed through the throat 16 defined by a throat knife 17 and roll 19. The cards then pass into first feed rolls 18 which feed the card under continuous motion through the first read station at 21. This read station is used if information is to be read from the card and transmitted to a calculator which results are used to operate the punch so as to punch the information into that card when that card arrives at the punch station. In such a case, read brushes 21 are provided to co-operate with the contact roll 20 to read the cards as they pass through. The cards are then fed into the punch station where the results of the information read from the card into a calculator is fed back into the punch station for punching the information back into that card.

In order to feed the cards through the punch station so that the punch can perforate the card while the card is standing still, we provide intermittently driven feed rolls 24 and 26. Opposing each of the intermittently driven feed rolls, we provide friction rolls 25 and 27. It is not required that these rolls 25 and 27 be driven intermittently since they receive their intermittent motion from the intermitently driven feed rolls 24 and 26 due to friction between them.

If this read punch device is used to reproduce information from a preceding card into an immediately succeeding card, for example, from a master card into an immediately following detail card, and from that detail card into the next following detail card and so on, read brushes 28 and contact roll 29 are provided for this purpose. When the read punch device is used as a reproducer, the brushes read the openings in the card as it passes underneath the brushes and transmits this information to the punch device so as to punch the information into the following card as it passes through the punch station. The details of such an arrangement will be hereinafter explained more fully. The card then passes into feed rolls 30 into a stacker 32. Since there are many types of devices for stacking cards and form no part of this invention, the stacker mechanism is shown schematically.

Figure 2:
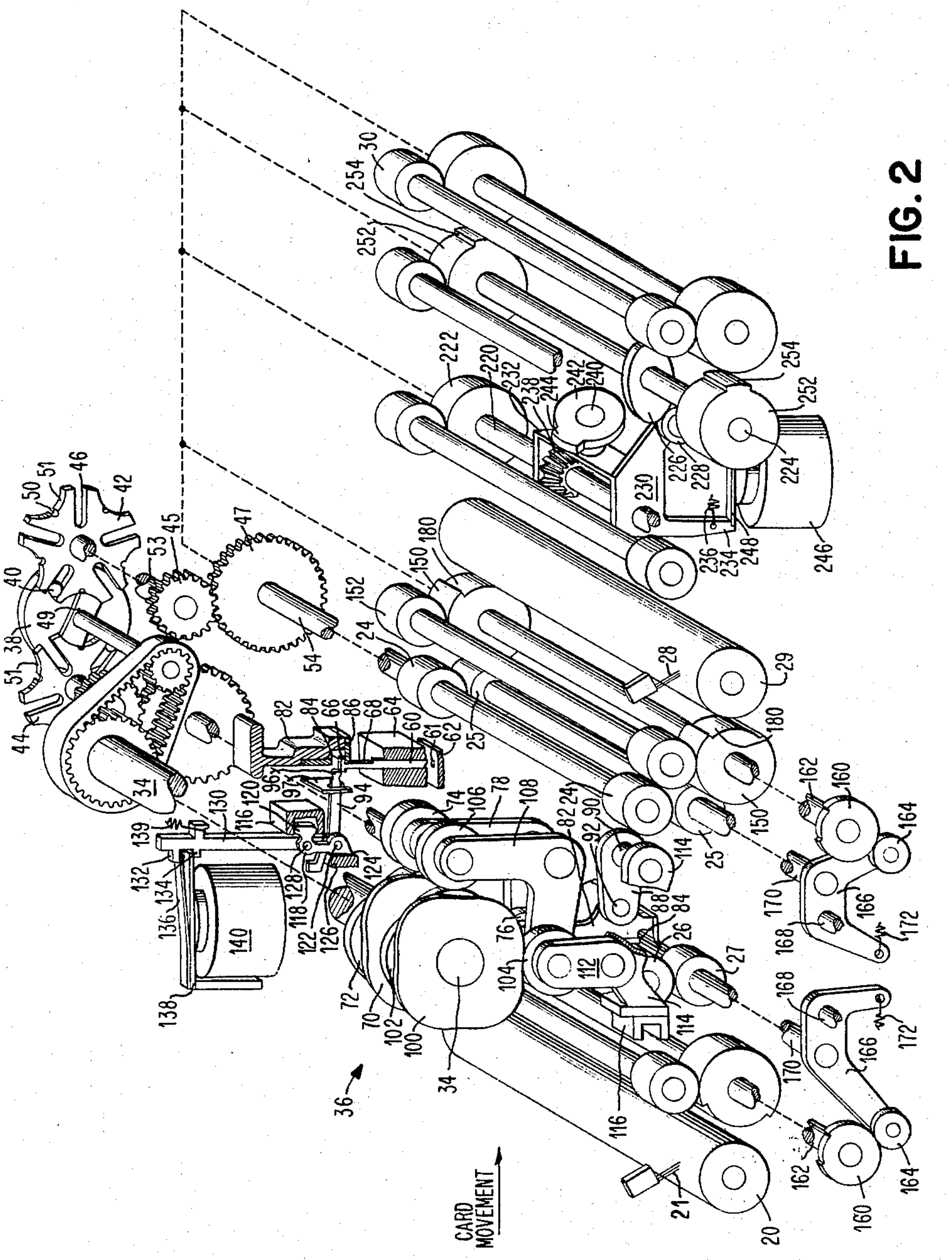
FIG. 2 is a perspective view of the card read punch device.

In order to synchronize the mechanical motions of the picker knife card feed, the intermittent motion of the card through the punch station and the punching device, we provide a main drive shaft 34 (FIG. 2) from which all of the other components are geared so as to be actuated in timing relation with the main drive shaft 34. The main drive shaft 34 drives the punch assembly 36, the details of which will be more fully hereinafter explained. The various drive shafts for the feed rolls are geared to the main drive shaft through appropriate gears and sprocket-like pulleys and belts in order to maintain the proper timing sequence of the rolls.

In order to drive the rolls 24 and 26 intermittently, so that the card is moved intermittently through the punch station for the punch to perforate the card while the card is motionless, a drive wheel 38 is provided with pins 40. The pins 40 in turn drive Geneva wheels 42 and 44 according to an intermittent motion. The Geneva wheels are turned intermittently by the pins 40 engaging slots 46. This type of a mechanism results in the gears 45 and 47 accelerating from zero velocity to a maximum velocity as the pin nears the base of the slot and then drops to zero velocity from the maximum velocity as the pin leaves the slot. During the time that one of the pins 40 leaves the slot to move around and engage the other Geneva wheel, the feed rolls are motionless so that the card is then in position to be punched.

In order to prevent the Geneva wheels from rotating while the pins 40 are out of the slots 46, a rotating locking guide member 49 fixed to the wheel 38 is provided. In order to maintain positive locking, the lock member 49 must extend a sufficient distance. However, as the locking guide member 49 leaves the intermediate portion 51 there is a tendency for the trailing edge to engage the base of the intermediate portion. Therefore, to eliminate binding and the like and excessive wear and still attain positive locking, a notch 50 is provided in the base of the intermediate portion 51. As a result of this Geneva mechanism, the rolls 24 and 26 are driven intermittently through gears 45 mounted on Geneva wheel shafts 52 and gears 47 mounted on the intermittent motion shafts 54.

A preferred application of this invention has to do with reproducing cards where it is important to maintain the timing of the card at the read station so as to read the openings at the appropriate time, which openings when read provide an impulse to the punch device. In this manner, openings representing bits of information in the preceding card can be punched into an immediately succeeding card. This was previously done by intermittent feed rolls at the read station one card cycle removed from the punch station. In other words, if a 9 was read on the card at the read station, the punch magnet was actuated when the 9 hole in the card was at the punch station. However, there was a certain amount of time delay which was inherent in every machine due to the operation of the magnet and the punch assembly. Therefore, it is preferred to use a punch assembly which is quick acting with a minimum of time delay in order to obtain high speed operation. Therefore, the punch assembly 36 includes a punch 60 adapted to be actuated into an opening 61 in a punch die 62. After the punch passes through the card into the punch die, it must be removed from the card. For this purpose, we provide a stripper 64. The punch is provided with a head 66 and a recess 68 to form an abutment for extracting the punch.

In order to oscillate the punch bail, active and complementary cams 70 and 72 are provided on the shaft 34. Followers 74 and 76 ride on the cams and are rotatably attached to link 78. A bail 82 is pivoted to the link 78 and has a punch bail 84 attached to operate the punch through the action of the interposer 94. A restoring bar 86 is attached to the bail 82 to restore the punch out of the card after it punches a hole. The punch bail 84 and the restoring bar 86 provide spaced abutment surfaces. These spaced surfaces do not actuate the punch unless the punch is to pierce the card during that cycle. In order to guide the bail 82 and the punch bail 84 and restoring bar 86, a guide link 88 is fixedly pivoted at 90 and pivoted to the bail 82 at 92. Therefore, normally the bail 82 is oscillated in response to the cams along with the punch bail 84 and punch restoring bar 86, without engaging the head of the punch so as not to actuate the punch.

The punch set up mechanism includes an interposer 94 provided with a head 96. The interposer head is moved into the space between head 66 and the punch bail 84 when the read brushes 28 read a hole or from any other timed pulse. When this happens, downward movement of the punch bail 84 will engage the interposer head 96 to move the punch 60 through the card into the punch die 62. The head 96 is maintained in position at all times to be actuated into the space between the punch bail 84 and the top of the head 66. An interposer guide 97 is provided to guide the interposer as it is actuated into and out of the space between the abutment 84 and the head 66 of the punch.

It is preferred to use a quick acting set up mechanism which has minimum time delay. This set up mechanism is intended merely as an example of one method, recognizing that other set up mechanisms could also be used. An indirect method of operating the interposer is provided by active and complementary cams 100 and 102 mounted on shaft 34. Followers 104 and 106 are provided to ride on the complementary cams and are rotatably mounted in the bell crank 108. An arm 112 is pivoted to the link 108 and pivoted to set up link 114. The set up link is also pivoted to a fixed pivot at 90 so as to guide the set up link. A set up bail 116 is provided at the end of the set up link for actuating a bell crank 118. The bell crank is provided with a head 120 at one end so as to be actuated by the set up bail 116 and is pivotally attached at its other end to the interposer 94 at 122. The interposer is provided with a sliding surface 124 to slide on a guide surface 126 so that the interposer is constrained in its motion. The bell crank 118 is pivotally attached at 128 to a slide 130. The slide 130 is provided with spaced abutments 132, 134 which operate an armature 136 in co-operation with a flat spring 138 attached to the armature. The armature 136 is pivotally connected to the magnet 140 so as to be actuated thereby. A spring 139 biases the slide 130 to follow the motion of set up bail 116.

The punch normally operates by active and complementary cams 70 and 72 actuating the spaced punch bail 84 and punch restoring bar 86, and the cams are designed so as to actuate the punch bail to operate continuously at cycle point timing. The punch bail 84 will therefore oscillate without actuating the punch and without piercing the card. When the read brushes read an opening in the card at the read station, the pulse is timed so as to actuate the magnet 140 and attract armature 136 when the punch bail 84 is being restored. The abutment 132 mechanically actuates the armature to its closed position and holds the armature in this position when the magnet is pulsed. The pulse is designed to be sufficiently long to energize the magnet to hold the armature until the interposer is actually over the head of the punch, the punch bail has engaged the interposer head 96 and the card is pierced. Also the set up bail 116 is timed to actuate the bell crank 118. This is accomplished by the cams 100 and 102 being so designed as to actuate the set up bail 116 for every index point on the card. When the magnet 140 is not energized, the armature 136 will move with the spaced abutments 132 and 134 on the slide 130. Also the set up bail 116 will carry with it the bell crank 118 without it pivoting about the point 128 since the set up bail 116 also moves upwardly. The interposer 94 will not be actuated over the head 66 of the punch unless the slide 130 is constrained from moving upwardly during this time. Therefore, when a pulse is received and the magnet 140 is energized, the armature 136 will be held down to prevent the slide 130 from moving upwardly and the set up bail 116 will pivot the bell crank 118 about its pivot point at 128 so as to move the bell crank counterclockwise and actuate the interposer 96 over the head 66. As mentioned previously, the pulse is held sufficiently long to permit the punch bail 84 to engage the head 96 and drive the punch downward through the card into the punch die 62.

Figure 3:
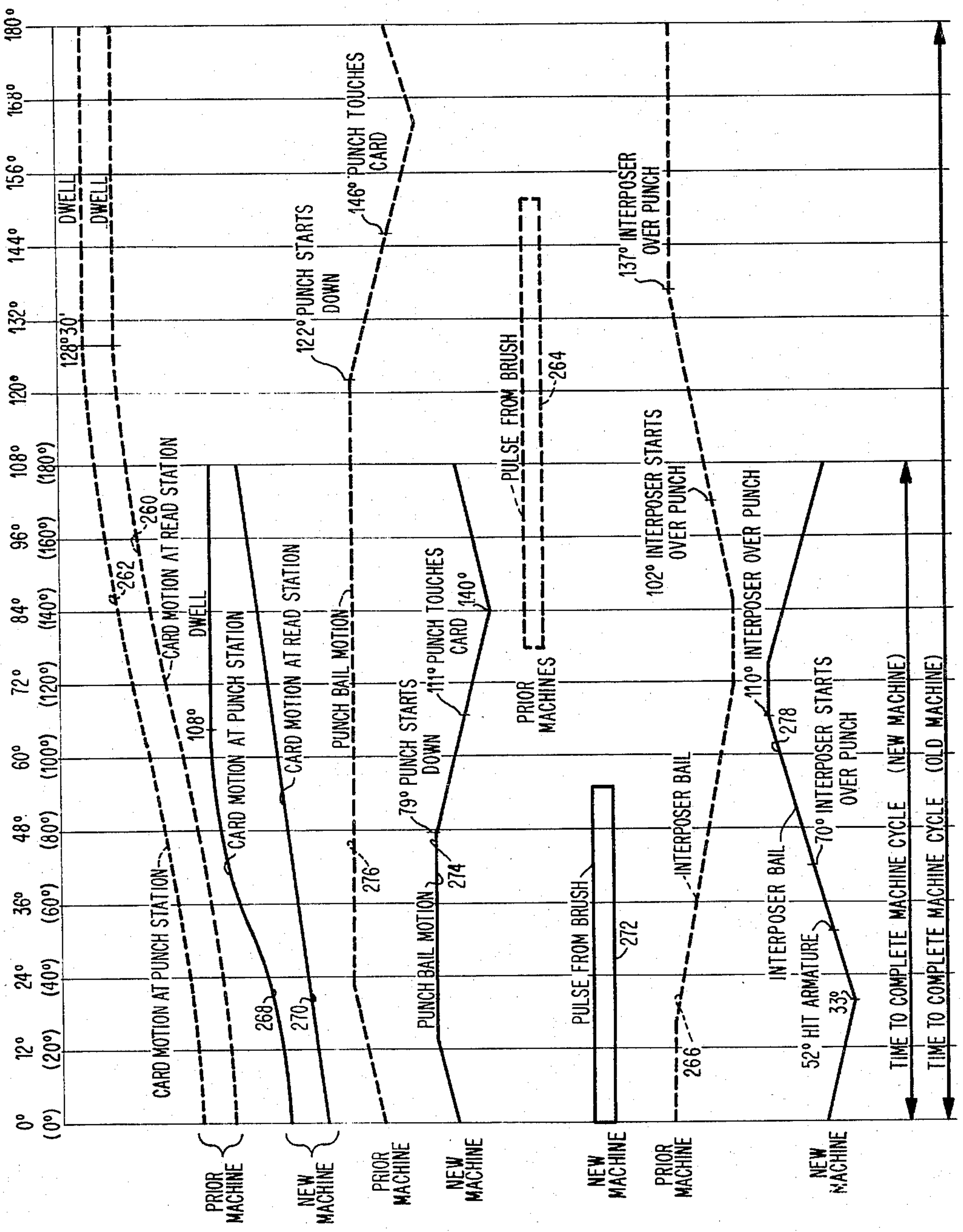
FIG. 3 is a timing diagram showing the timing of the read pulse and punch set up mechanism.

The use of intermittent feed rolls at the read station in addition to intermittent feed rolls at the punch station to maintain the phase relationship of a card at the read station and another card at the punch station, has placed a limitation on increasing the output of a read-punch device. Referring to FIG. 3, a typical timing diagram of a prior read punch shown in dotted line is compared to a punch embodying this invention shown in solid lines. The timing of a machine embodying this invention is expressed in degrees enclosed in parenthesis while the other degrees shown are representative of prior art machines. A machine embodying the invention takes approximately three-fifths the time to complete a machine cycle as prior machines. The intermittent motion of the card past the read station and punch station of a prior machine is represented by the dotted line curves 260, 262. This represents the in phase relation discussed previously.

In previous machines, the read brushes were positioned one card cycle from the punch station. Therefore, the pulse represented by box 264 is shown taking place while the card is in motion. The pulse starts slightly earlier than the dwell portion of the card motion. The set up mechanism is actuated to get the punch ready to perforate the card shortly after card movement ceases. This is shown by the pulse box 264 beginning at approximately 78° and holding the pulse until approximately 151°, to provide ample time for the interposer to be positioned over the punch head and held there until shortly after the punch touches the card. Also, the dotted line curve 266 represents the set up mechanism for setting up the magnet and interposer bail and begins at about 90°, shortly after the start pulse at 78° and held there until approximately 137°.

Now it is important that the pulse be held for a certain period of time (not degree time), say 9.8 milliseconds in order to provide sufficient time for the set up mechanism to actuate the interposer for punching. If, however, the intermittent card motion speed was increased, then less than 9.8 milliseconds would be available for setting up the punch. In view of the time delays, this time would be insufficient to actuate and hold the interposer in position long enough for it to perform its function. For example, if the time were decreased to 8 milliseconds and it took 9 milliseconds to actuate and hold the interposer over the punch head, the magnet would be de-energized prematurely. This would cause the interposer to return prematurely. If, however, the brushes were moved closer to the punch station thinking to gain more pulse time, the gain would not result in significant increased speed of the punch since the length of the pulse is limited by the close positioning of the succeeding hole in the card.

Referring now to the solid line curves in FIG. 3, which represent a machine embodying the invention, it is noted that the curve 268 representing card motion through the punch station is intermittent. However, card motion through the read station, represented by curve 270, is out of phase with the card motion through the punch station. For purposes of this invention, it is preferred to move the card continuously through the read station, although the card could be moved with any different motion through the read station, but out of phase with the card at the punch station and obtain the same results. It has been found that it is not necessary to maintain the phase relationship of the card at the read station with the card at the punch station when reproducing cards in a duplicator. By properly controlling the card so that you know where it is, it is only necessary to pulse at the most desirable time. This is accomplished by moving the card at the read station independently or asynchronously with respect to the card at the punch station, as compared to moving them in synchronism and in phase in previous read punches.

When reading out of phase at the read station with respect to punching at the punch station and without using storage devices to hold the pulse, the read brushes can be physically positioned at the most desirable place to provide the best pulse timewise. For example, in FIG. 3, the pulse represented by box 272 is the result of the read brushes being positioned significantly closer to the punch station to provide a longer pulse beginning at 0° punch cycle time and extending to approximately 90°. The card is moving continuously through the read station, at lesser speeds, as compared to the accelerations which accompany an intermittent card motion. In addition the pulse can be positioned at any location in the punch cycle to most advantageously accommodate time delay requirements. As a result, the punch can now start earlier and take a longer portion of the cycle time to perforate the card, for example, as shown by curve 274, which starts at 79° as compared to 122° as shown by curve 276. This decreases the acceleration forces on the punch mechanism to such an extent that operation is feasible at nearly double the previous operating speeds. Also, the set up mechanism, as represented by the solid curve 278, can take place over a longer period of cycle time as a result of the earlier and longer pulse time. For example, the set up mechanism is pulsed into action at approximately 33° and held there until after the length of the pulse at approximately 110°.

In order to read the card sufficiently early to set up the punch assembly, the read brushes at 28 and the contact roll at 29 are positioned less than a card cycle from the punch station. Also, the continuously rotating rolls must co-operate with the intermitent feed rolls to accommodate intermittent motion, and the intermittent feed rolls must co-operate with the continuously rotating feed rolls to accommodate continuous motion. In order for the intermittent feed rolls to accommodate continuous motion during the passing of the cards through the rolls, a roll opening device is provided. Although it is preferred to use a roll opening device for accommodating continuous motion in the intermittent feed rolls, it is recognized that the same could be accomplished by a recessed portion in the periphery of one of the feed rolls exposed to the card when it is desired to have continuous motion.

Cams 160 (FIGS. 1 and 2) are provided, each mounted on a continuously rotating shaft 162. The cams are so designed as to drop or open the lower intermittent feed rolls 25, 27 at the proper time. A follower 164 operates on each cam 160 and is mounted on a roll opening link 166. The roll opening links 166 are pivotally mounted on respective fixed pivots 168 and rotatably support corresponding shafts 170. Springs 172 spring bias the followers into engagement with the cams 160. Therefore, when the followers 164 hit the high portion of the respective cams 160, the links 166 pivot about their pivots 168 to lower the corresponding rolls 25, 27 to permit a new card to enter and the punched card to leave the punch station by continuous motion imparted by the continuously rotating feed rolls 151, 153 and 150, 152, respectively, in the manner now to be explained.

Since the read brushes 28 and the contact roll 29 are located less than one card cycle from the punch station, the continuously rotating feed rolls 150, 152 must also be less than one card cycle from the punch station. Therefore, rolls 150, 152 must be capable of accommodating intermittent motion while the card is passing through said rolls. This is accomplished by providing a recess or interrupted periphery 180 on the feed roll 150. As pointed out previously with respect to the other feed rolls, it is only necessary to provide the lower feed roll 150 with a recess, whereas the upper feed roll 152 which co-operates with the continuously rotating feed roll 150 to move the card has a continuous periphery and rotates with the uninterrupted portion of the feed roll 150 due to friction. The continuous feed rolls 151, 153 positioned ahead of the punch station are constructed in the same manner as feed rolls 150, 152 respectively and serve the same purpose.

Figure 4:
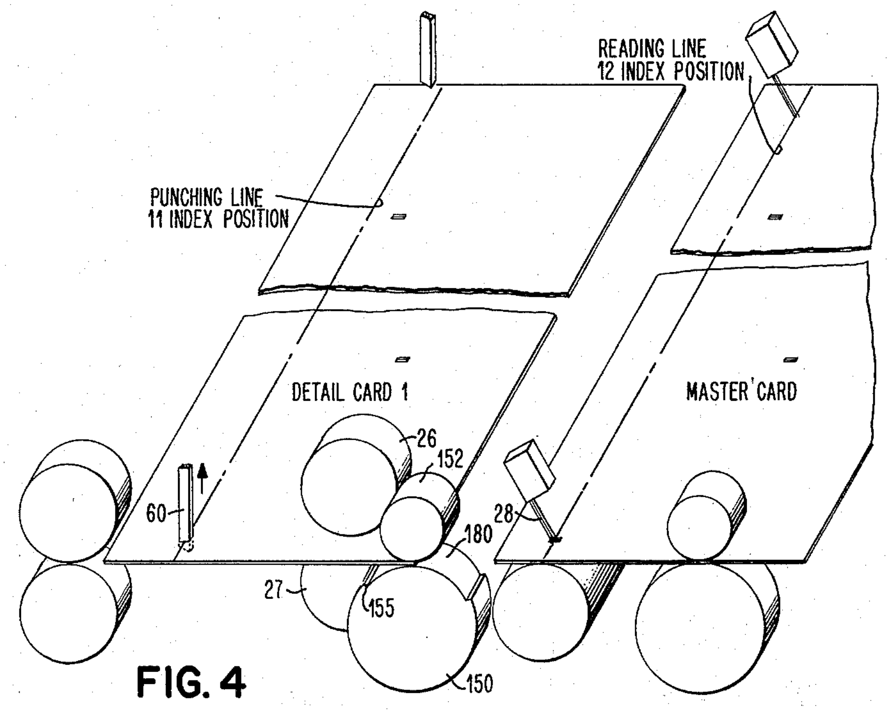
Figure 5:
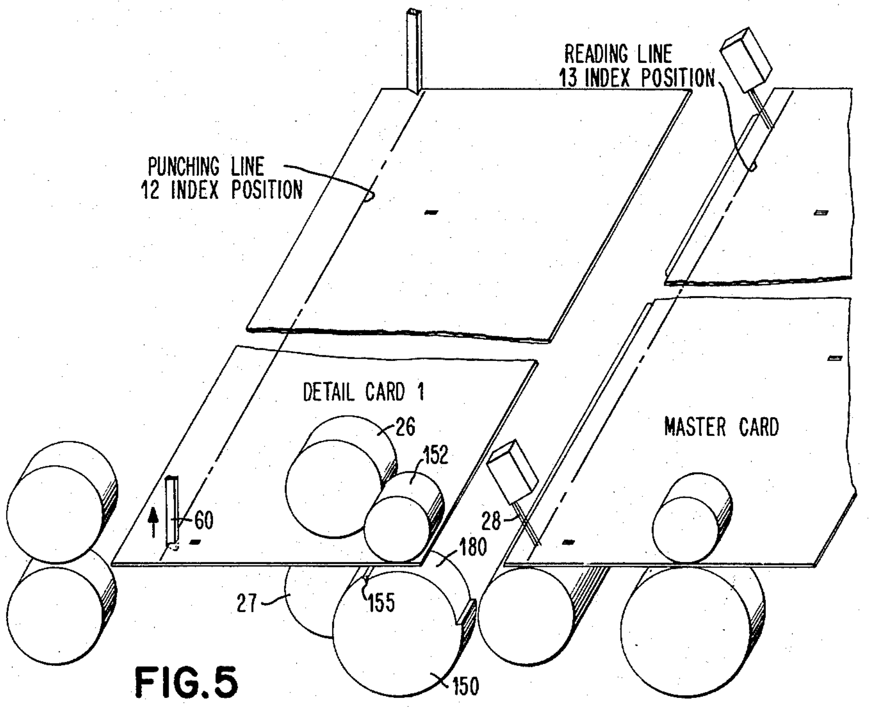

Reference is now made to FIGS. 4–6 in which various positions of the master card and detail card are shown as they pass through the intermittent motion feed rolls 24, 25 and 26, 27 and continuous feed rolls 150, 152 and 151, 153 and the relationship of the punch 60 with respect to the sensing means or read station. In FIG. 4, a master card is shown (9 hole first) passing through the sensing station, and, as the sensing brushes 28 sense the hole at the 12 index position, the punch 60 is almost restored out of the card at the 11 hole or index position (see curves 272 and 274). Since punching and sensing are not synchronous, the sensing brushes 28 can sense a later hole (12 hole) from the hole being punched (11 hole) in the detail card at the punch station. During this time, the detail card at the punch station is still under the control of the intermittent feed rolls 26, 27 with the recessed portion 180 of the continuously rotating feed rolls 150 exposed to the upper feed roll 152.

Referring to FIG. 5, the master card is shown leaving the brushes 28, which is approximately at the 13th index position on the card with the punch 60 shown leaving the 12 hole on the number one detail card. In order for detail card number one to move into the read station shortly after the punch has left the 12 hole, the edge 155 on the periphery of the continuous roll 150 engages the card to change its speed to carry it into the read station at continuous motion so as to give the read brushes more time in which to pulse the hole. This is the point of speed transition of the card. It is necessary to either speed the card up or change the distance from the punch station to the read station to satisfy the out of phase and time delay requirements. For purposes of this invention, it is preferred to move the read station.

Referring to FIG. 6, detail card number one arrives at the read station so that the read brushes can read the 9 hole (if there be a 9 hole) in order to set up the magnet and interposer to actuate the punch before detail card number two reaches the 9 position at the punch station. The speed transition is arranged to take place in less than one card cycle in order for the index point to arrive at the read station ahead of the index point to be punched at the punch station.

Since it has been found that the card at the read station can be moved continuously (out of phase) beyond the punch station, this same type of motion (out of phase) can be applied to the card prior to its intermittent motion through the punch station. Therefore, if the punch is to be used with a computer, then the card can be fed by continuous feed rolls through a read station positioned ahead of the punch station to accommodate time delays through the calculator and control mechanism for the punch. The out of phase arrangement can be applied to punching ahead from a following card into a lead card.

In order to further explain the out of phase condition of reading with respect to punching, reference is made to FIGS. 7 and 8. FIG. 7 shows curves representing a typical prior art arrangement in which curve 280 is representative of card motion at the read station in phase with curve 282 which is representative of card motion at the punch station. The purpose of this figure is to show that although the pulse as represented by box 281 is made slightly earlier than the start of the punch motion as shown at 283, the speed of punching cannot be increased. This is due to the card motion at the read station and punch station being substantially the same. In order to increase punching speed to obtain greater card output, the length of punch time (machine degree time not actual time) would have to be increased. This is due to the acceleration forces on the mechanism already being at its maximum. However, if the brushes are moved still further toward the punch station to increase punch time, reading will take place at about point 284 on the curve which is the highest point of acceleration. Then the read brushes would be in and out of the hole as shown by the pulse box at 285 before punching could take place. The pulse would not be held long enough to keep the interposer in engagement with the punch to perforate the card. Therefore, movement of the punch to gain punch time (in degrees) cannot take place before $T_2$.

Reference is now made to FIG. 8 which shows curve 286 representing intermittent card motion through the punch station and curve 288 representing continuous card motion through the read estation. In view of the constant velocity of the card being read, the pulse can be placed at the most convenient location and will be longer. The longer pulse is obtainable due to the card passing the brushes at uniform velocity as compared to the prior higher changing velocities when attempting to position the brushes at this most convenient position. In other words, the velocity at point 285 (FIG. 7) is much higher than the continuous velocity at point 287 (FIG. 8) resulting in longer pulse time (degrees). This is represented by pulse box 290 which is shown positioned at the same relative location as box 285 with respect to the acceleration curve. The punch stroke can be made to take place before $T_2$ and last over a longer period of machine time, thereby permitting faster operation of the punch yet maintaining the same or less acceleration forces as compared to previous punches.

Referring to FIG. 1, it is noted that the recessed portion 180 of the continuous feed rolls 150, 151 is exposed to the card before the card is completely passed through the continuous feed rolls, and also, the intermittent feed rolls 24, 25 and 26, 27 are open so as to permit alignment of the card prior to moving into the punch station. Also, an aligner moves the card up to the punch station to register the card with respect to the punch station. For this purpose a cam 200 is mounted on the shaft 162 of the continuous feed rolls. A follower 202 is positioned to ride on the cam 200 and it is mounted in a pivoted actuator link 204. The actuator link 204 is pivoted about its pivot 208 and pivotally supports aligner link 206. The aligner link 206 has a card aligning engaging head 210 for engaging the trailing edge of the card. The cam is designed so that during a portion of the cycle the card aligning engaging head 210 pushes the card into the punch station while the cam operated intermittent feed rolls are open. The intermittent feed rolls 24, 25 then close so as to move the card intermittently through the punch station.

The card read punch is also provided with an offset stacker in case a card is punched in error or there has been an omission to punch. For this purpose, read brushes 28 are used for verifying the punched openings in the card. In order to offset the card (FIG. 2) from the other cards so that when it moves into the stacker it can be readily seen and removed, a shaft 220 is provided which is driven in time sequence from the main shaft 34 through a plurality of gears and the like. The shaft 220 carries feed rolls 222. Shaft 224 is also connected to shaft 220 and supports a cam 226. A follower 228 is positioned to ride on the cam 226 and is mounted on an arm 230. The arm 230 is connected to a yoke 232 mounted on shaft 220. The yoke 232 contains an arm 234 and spring 236 to maintain the follower 228 in engagement with the cam 226 at all times. The yoke 232 contains bevel gears 238 one of which is fastened to a shaft 240 rotatably mounted in the yoke 232. The shaft 240 is connected to a rotatable offsetter 242 which contains a protuberance 244 for frictionally engaging a mating feed roll (not shown) so as to offset the card from the other cards passing through.

In order to raise the rotatable offsetter 242, a magnet 246 and a normally latched armature 248 are provided. When the magnet 246 is impulsed as a result of a card punched in error the armature 248 unlatches the arm 234. Therefore, when the cam 226 reaches its low point for actuating the follower 228, the cam 226 pivots the arm 230 so that it raises the yoke 232 and rotatable offsetter 242 into the card path to offset the card. If the magnet remains energized, the rotatable offsetter is not latched up. If the armature is latched to the arm 234, then the offsetter will rotate below the card path without engaging the card.

In order to permit the time for offsetting to take place, feed rolls 252 are provided with a protuberance 254 to engage the card at only a portion of its revolution. The cards are then fed into feed rolls 30 which then deposit the card in the stacker 32.

Although the preferred embodiment is to transmit information into succeeding cards, the invention can also be used to transmit information into preceding cards in a similar manner.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Mechanism for feeding successive cards along a given pathway through a machine, said mechanism comprising two pairs of cooperating rolls spaced apart along the pathway a distance less than that between the leading and trailing edges of a card, means for rotating at least one of the rolls of one of said pairs intermittently to frictionally drive a card stepwise through said one pair of rolls, means for rotating at least one of the rolls of the other pair of rolls at a constant speed, and means operated in synchronously timed relation with a rotating roll of said other pair and operatively connected to at least one of the rolls of said one pair to spread said one pair of rolls relatively apart whenever a card is positioned to be effectively driven by said other pair of rolls.

2. Mechanism for feeding successive cards along a given pathway through a machine, said mechanism comprising two pairs of cooperating rolls spaced apart along the pathway a distance less than that between the leading and trailing edges of a card, means normally biasing the rolls of one of said pairs relatively toward each other to frictionally engage a card, means for rotating at least one of the rolls of said one pair intermittently to frictionally drive a card stepwise through said one pair of rolls with alternate periods of movement and dwell, means for rotating at least one of the rolls of the other pair of rolls at a constant speed, one of the rolls of said other pair having a cam-like surface defined by adjoining high and low portions of such dimension that said other pair of rolls will pinch and frictionally drive a card only when it is engaged by said high portion, and means operated in synchronously timed relation with a rotating roll of said other pair and operative to spread said one pair of rolls relatively apart whenever said high portion engages a card, thereby to prevent both pairs of rolls from concurrently attempting to impart different types of driving movement to the same card.

3. In a mechanism for applying to one record card information corresponding to that contained on an immediately preceding card, the combination of a marking member, read means for sensing information recorded on the preceding card, means controlled by the read means for actuating the member to apply to the one card the information read from the preceding card, one pair of feed rolls including at least one intermittently rotated feed roll for moving the one card stepwise past the marking member, another pair of feed rolls including at least one constantly rotating roll and positioned ahead of the read means and less than one card length from the one pair such that the one card will pass between the other pair before it leaves the one pair, and means providing a synchronized operating connection between said constant roll of said other pair and at least one roll of said one pair for spreading said one pair of rolls relatively apart when said one card is positioned to be effectively driven by said other pair of rolls.

4. In a mechanism for applying to one card information corresponding to that recorded on an immediately preceding card, the combination of a movable marking member, read means for sensing recorded information on said preceding card, means controlled by said read means to actuate said marking member to a marking position to mark said one card when said read means senses information on said preceding card, feed rolls rotated intermittently to move said one card past said marking member in steps comprising alternate periods of movement and stationary dwell, means coordinating the movements of the marking member and feed rolls to cause the member to mark said one card while it is motionless, other feed rolls near the read means and disposed less than a full card length from the intermittently rotated rolls, at least one of said other rolls rotating at constant speed to cause said other rolls to move said preceding card uninterruptedly past the read means, and means providing a synchronized operating connection between the intermittently rotated rolls and other rolls to release said one card from control by said intermittently rotated rolls at a preselected time so that motion of said one card may be controled by said other rolls.

5. In a mechanism for applying to one record card information corresponding to that contained on an immediately preceding card, the combination of a marking member, read means for sensing information recorded on the preceding card, means controlled by the read means for actuating the member to apply to the one card the information read from the preceding card, at least two pairs of cooperating rolls disposed between the marking member and read means and spaced apart less than a complete card length such that the one card will move between the one pair of rolls nearest the read means before it leaves the other pair of rolls nearest the marking member, said one pair comprising at least one roll rotating at a constant speed and at least one roll having a recess in its periphery to prevent said one pair from frictionally driving the one card except when the non-recessed peripheral part of such roll engages said card, means for rotating at least one of the rolls of the other pair intermittently in steps comprising alternate periods of movement and dwell to cause said other pair to move the one card stepwise past the marking member, cam means driven in unison with one of the rolls of said one pair, and means operatively connected to one of the rolls of said other pair and controlled by said cam means to spread said other pair of rolls so they will cease driving said one card at the time the one card is engaged by the non-recessed part.

6. In a mechanism for applying to one record card information corresponding to that contained on an immediately preceding card, the combination of a marking member, read means for sensing information recorded on the preceding card, means controlled by the read means for actuating the member to apply to the one card the information read from the preceding card, one pair of feed rolls including at least one intermittently rotated feed roll for moving the one card stepwise past the marking member, another pair of feed rolls including at least one constantly rotating roll and positioned ahead of the read means and less than one card length from the one pair such that the one card will pass between the other pair before it leaves the one pair, one of the rolls of said other pair having a large diameter part for frictionally engaging and driving a card and a smaller diameter part which when in registry with a card renders said other pair ineffective to drive such card, and means providing an operating connection between said one pair and other pair for spreading the one pair when said large diameter part registers with a card and moving the one pair of rolls relatively toward each other when the small diameter part registers with a card, whereby movement of a card will be controlled successively by the one pair and then said other pair of rolls to prevent subjection of the card concurrently to the different driving characteristics of the one and other pairs of rolls.

7. The combination according to claim 6, wherein the large diameter part registers with a particular card immediately after the last markable line of said particular card is marked by the marking member.

References Cited in the file of this patent

UNITED STATES PATENTS

| | | |
|---|---|---|
| 998,736 | Armstrong | July 25, 1911 |
| 2,165,302 | Rabenda | July 11, 1939 |
| 2,531,873 | Daly | Nov. 28, 1950 |
| 2,590,806 | Vorderstrasse | Mar. 25, 1952 |
| 2,845,122 | Lake et al. | July 29, 1958 |
| 2,862,555 | Jurgens et al. | Dec. 2, 1958 |